United States Patent
Livescu et al.

(10) Patent No.: US 10,053,935 B2
(45) Date of Patent: Aug. 21, 2018

(54) LUBRICATING COMPOSITIONS FOR USE WITH DOWNHOLE FLUIDS

(71) Applicant: BAKER HUGHES INCORPORATED, Houston, TX (US)

(72) Inventors: Silviu Livescu, Calgary (CA); John Delorey, Calgary (CA); John Misselbrook, Calgary (CA)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 14/212,050

(22) Filed: Mar. 14, 2014

(65) Prior Publication Data

US 2015/0007995 A1    Jan. 8, 2015

Related U.S. Application Data

(60) Provisional application No. 61/842,680, filed on Jul. 3, 2013.

(51) Int. Cl.
| | |
|---|---|
| *E21B 43/25* | (2006.01) |
| *E21B 21/00* | (2006.01) |
| *C09K 8/03* | (2006.01) |
| *C09K 8/60* | (2006.01) |
| *C09K 8/64* | (2006.01) |
| *C09K 8/68* | (2006.01) |

(52) U.S. Cl.
CPC .............. *E21B 21/00* (2013.01); *C09K 8/03* (2013.01); *C09K 8/602* (2013.01); *C09K 8/64* (2013.01); *C09K 8/68* (2013.01); *C09K 2208/12* (2013.01); *C09K 2208/34* (2013.01)

(58) Field of Classification Search
CPC .................... C09K 8/26; C09K 8/22

USPC .......................................................... 507/138
See application file for complete search history.

(56) References Cited

U.S. PATENT DOCUMENTS

| | | | |
|---|---|---|---|
| 4,447,341 A | 5/1984 | Block | |
| 5,883,054 A | 3/1999 | Hernandez et al. | |
| 6,156,708 A | 12/2000 | Brookey et al. | |
| 6,806,235 B1 * | 10/2004 | Mueller | C09K 8/06 507/138 |
| 7,334,640 B2 | 2/2008 | Hanes, Jr. et al. | |

(Continued)

FOREIGN PATENT DOCUMENTS

| | | |
|---|---|---|
| CA | 1223458 A1 | 6/1987 |
| EP | 0353872 A1 | 2/1990 |
| WO | 03052023 A1 | 6/2003 |

OTHER PUBLICATIONS

Balchem (Choline Product for Clay Stabilization).*

(Continued)

*Primary Examiner* — William D Hutton, Jr.
*Assistant Examiner* — Avi T. Skaist
(74) *Attorney, Agent, or Firm* — Mossman, Kumar & Tyler, P.C.

(57) ABSTRACT

An aqueous-based downhole fluid having a lubricant therein may be circulated within a subterranean reservoir wellbore where the downhole fluid may be or include a drilling fluid, a completion fluid, a fracturing fluid, a drill-in fluid, a workover fluid, and combinations thereof. The lubricant may include a clay stabilizer and a vegetable oil derivative, such as but not limited to, a sulfonated vegetable oil. The downhole fluid may include the lubricant in an effective amount for lubricating a first surface.

15 Claims, 2 Drawing Sheets

(56) References Cited

U.S. PATENT DOCUMENTS

| | | | |
|---|---|---|---|
| 7,829,506 B1 | 11/2010 | Tehranchi | |
| 7,842,651 B2 | 11/2010 | Wu et al. | |
| 8,071,510 B2 | 12/2011 | Scoggins et al. | |
| 8,211,835 B2* | 7/2012 | Howard | C09K 8/602 166/305.1 |
| 2005/0103497 A1* | 5/2005 | Gondouin | E21B 36/003 166/302 |
| 2009/0170730 A1* | 7/2009 | Wu | C09K 8/035 507/102 |
| 2010/0016180 A1* | 1/2010 | Scoggins | C09K 8/035 507/135 |
| 2010/0027371 A1 | 2/2010 | Lucas et al. | |
| 2011/0071058 A1 | 3/2011 | Howard et al. | |
| 2011/0259588 A1* | 10/2011 | Ali | C09K 8/665 166/280.2 |
| 2012/0157353 A1* | 6/2012 | Breeden | C09K 8/24 507/119 |
| 2014/0011720 A1* | 1/2014 | Antzutkin | C10M 105/78 508/198 |

OTHER PUBLICATIONS

Afghoul et al. (Coiled Tubing: The Next Generation).*
Bowden et al. (the Friction and Lubrication of Solids, 2001).*
Baojun, Li et al., "The Drilling Fluid Technology for the Top Formation in South Los Tan Blocks of Turkmenistan," SPE155908 pp. 1-9 (2012).
Supplemental EPO Search Report in EP 14819288 dtd Dec. 19, 2016.
Han, Yixiu bc, et al., ""Green" anionic wormlike micelles induced by choline, Royal Society of Chemistry, Feb. 2012, 17 pages.
Shaukat, Saadia, "Hydration, Ion Binding and Self-Aggregation of Choline and Choline-based Surfactants", Dissertation Universitat Regensburg, 2012, 1-141.
Livescu, Silviu, et al., "Challenging the Industry's Understanding of the Mechanical Friction Reducing for Coiled Tubing Operations", Oct. 1-19, 2014.
Livescu, Silviu, et al., "Increasing Lubricity of Downhole Fluids for Coiled-Tubing Operations", Mar. 1-9, 2014.
Castro, L., et al., "Overcoming Extended-Reach Challenges for Annular Fracturing", Mar. 1-10, 2015.

* cited by examiner

LUBRICATING COMPOSITIONS FOR USE WITH DOWNHOLE FLUIDS

CROSS-REFERENCE TO RELATED APPLICATION

This application claims the benefit of Provisional Patent Application No. 61/842,680 filed Jul. 3, 2013, which is incorporated by reference herein in its entirety.

TECHNICAL FIELD

The present invention relates to lubricants usable within downhole fluids, and more particularly relates, in one non-limiting embodiment, to lubricants including at least a clay stabilizer and a vegetable oil derivative, such as but not limited to, a sulfonated vegetable oil, where the downhole fluid is a drilling fluid, a completion fluid, a fracturing fluid, a drill-in fluid, a workover fluid, and combinations thereof.

BACKGROUND

A substantial portion of the time required for well intervention operations, drilling operations, completion operations, and/or fracturing operations is consumed in replacing worn metal pieces and/or equipment used for these tasks. Excessively high torque and drag may cause excessively costly delays or interruptions during downhole operations. The metal surfaces also wear down due to frictional forces, resulting in reduced equipment life. These problems generally increase at high temperatures and/or high pressures.

Lubricants or lubricating agents may be added to a downhole fluid to reduce or decrease friction, torque, and/or drag between two surfaces. This may be especially important when one or both surfaces are metal surfaces, such as within and/or around coiled tubing used during coiled tubing operations. Coiled tubing is used in the oil and gas industry for interventions in oil and gas wells, as production tubing in depleted gas wells, and/or for similar operations to wirelining. Chemicals may be pumped through the coiled tubing and may be pushed into the hole instead of relying only on gravity to get the chemicals into the hole. Coiled tubing is a metal piping typically ranging in diameter from about 0.5 inch independently to about 5 inches depending on the coiled tubing operation.

The downhole fluids may be drilling fluids, completion fluids, fracturing fluids, etc. Drilling fluids are typically classified according to their base fluid. In water-based fluids, solid particles are suspended in a continuous phase including water or brine. Oil can be emulsified in the water, which is the continuous phase. "Water-based fluid" is used herein to include fluids having an aqueous continuous phase where the aqueous continuous phase can be all water or brine, an oil-in-water emulsion, or an oil-in-brine emulsion. Brine-based fluids, of course are water-based fluids, in which the aqueous component is brine.

Oil-based fluids are the opposite or inverse of water-based fluids. "Oil-based fluid" is used herein to include fluids having a non-aqueous continuous phase where the non-aqueous continuous phase is all oil, a non-aqueous fluid, a water-in-oil emulsion, a water-in-non-aqueous emulsion, a brine-in-oil emulsion, or a brine-in-non-aqueous emulsion. In oil-based fluids, solid particles are suspended in a continuous phase including oil or another non-aqueous fluid. Water or brine can be emulsified in the oil; therefore, the oil is the continuous phase. In oil-based fluids, the oil may include any oil or water-immiscible fluid that may include, but is not limited to, diesel, mineral oil, esters, refinery cuts and blends, or alpha-olefins.

Oil-based fluid as defined herein may also include synthetic-based fluids or muds (SBMs), which are synthetically produced rather than refined from naturally occurring materials. Synthetic-based fluids often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

There are a variety of functions and characteristics that are expected of completion fluids. The completion fluid may be placed in a well to facilitate final operations prior to initiation of production. Completion fluids are typically brines, such as chlorides, bromides, formates, but may be any non-damaging fluid having proper density and flow characteristics. Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof.

Chemical compatibility of the completion fluid with the reservoir formation and fluid is key. Chemical additives, such as polymers and surfactants are known in the art for being introduced to the brines used in well servicing fluids for various reasons that include, but are not limited to, increasing viscosity, and increasing the density of the brine. Water-thickening polymers serve to increase the viscosity of the brines and thus retard the migration of the brines into the formation and lift drilled solids from the wellbore. A regular drilling fluid is usually not compatible for completion operations because of its solid content, pH, and ionic composition.

Completion fluids also help place certain completion-related equipment, such as gravel packs, without damaging the producing subterranean formation zones. The completion fluid should be chemically compatible with the subterranean reservoir formation and its fluids.

A fracturing fluid is injected into a well as part of a stimulation operation. Fracturing fluids may include water, proppant, and a small amount of nonaqueous fluids designed to reduce friction pressure while pumping the fluid into the wellbore. Such fluids often include gels, friction reducers, crosslinkers, and/or breakers to reduce the viscosity of the gel, and surfactants. The type of additive added to the fracturing fluid is selected depending on the needs for improving the stimulation operation and the productivity of the well.

A drill-in fluid may be used exclusively for drilling through the reservoir section of a wellbore successfully, which may be a long, horizontal drainhole. The drill-in fluid may minimize damage and maximize production of exposed zones, and/or facilitate any necessary well completion. A drill-in fluid may be a fresh water or brine-based fluid that contains solids having appropriate particle sizes (salt crystals or calcium carbonate) and polymers. Filtration control additives and additives for carrying cuttings may be added to a drill-in fluid.

A workover fluid is a fluid for repairing or stimulating an existing production well for the purpose of restoring, prolonging or enhancing the production of hydrocarbons. A well intervention operation is any operation carried out on an oil or gas well during or at the end of its productive life that alters the state of the well and/or the well geometry, provides well diagnostics, or manages the production of the well. Such operations may include logging, gauging, plugging, re-perforating, and/or various downhole mechanical works to reduce flow restrictions when trying to obtain additional production volume from a well.

It would be desirable for lubricants added to downhole fluids to better lubricate metal surfaces for reducing friction, torque, and/or drag when the metal surface contacts another surface, particularly when one or both of the surfaces is metal.

SUMMARY

There is provided, in one form, a method for circulating a downhole fluid within a subterranean reservoir wellbore where the downhole fluid may be or include a drilling fluid, a completion fluid, a fracturing fluid, a drill-in fluid, a workover fluid, and combinations thereof. The lubricant may include a clay stabilizer and a vegetable oil derivative, such as but not limited to a sulfonated vegetable oil. The downhole fluid may have an effective amount of a lubricant for lubricating a first surface.

There is further provided in an alternative non-limiting embodiment a method where the first surface may be or include, but is not limited to a wellbore casing, a drill string, a pipe, a formation, a drill bit, a metal surface within a mud motor, formation evaluation tool, a drilling tool, a coiled tubing, and combinations thereof. When the first surface contacts a second surface different from the first surface, at least one property may be reduced, such as friction, torque, drag, wear, operating temperatures of the first surface, corrosion, and combinations thereof.

In yet another embodiment, a downhole fluid composition may include an aqueous-based fluid and a lubricant in an amount ranging from about 0.2 vol % to about 10 vol % of the total downhole fluid composition. The lubricant may include a clay stabilizer and a vegetable oil derivative, such as but not limited to a sulfonated vegetable oil.

In an alternative non-limiting embodiment of the downhole fluid composition, the lubricant may also include at least one surfactant. The aqueous-based fluid may be or includes a drilling fluid, a completion fluid, a fracturing fluid, a drill-in fluid, a workover fluid, and combinations thereof.

The lubricant appears to increase the lubricity of the downhole fluid, and also improve the clay stabilization properties of the downhole fluid.

DETAILED DESCRIPTION

Figure 1:
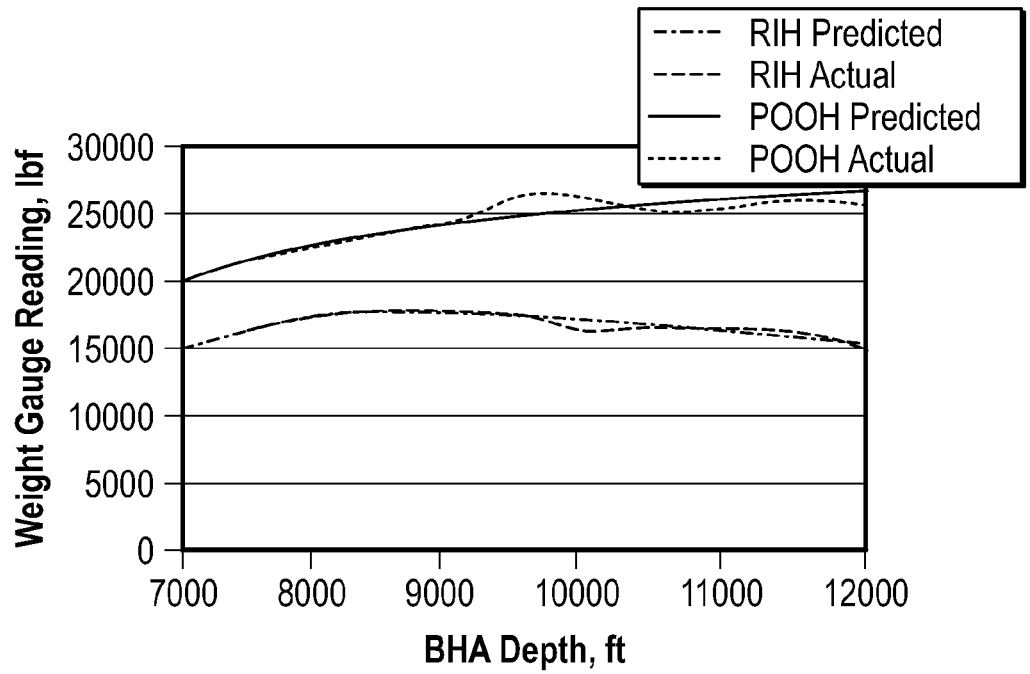
FIG. 1 is a graph illustrating the predicted and actual weight gauge curves during RIH and POOH with CoF of about 0.24 where no lubricant was present.

It has been discovered that a lubricant having a vegetable oil derivative and a clay stabilizer may be added to a downhole fluid for circulating the downhole fluid within a subterranean reservoir wellbore for lubricating a first surface, such as coiled tubing during a well intervention operation or a completion operation, in a non-limiting embodiment. The lubricant may reduce the coefficient of friction when applied to the coiled tubing, and thereby a thinner diameter of coiled tubing may be used for such an operation as compared to an otherwise identical coiled tubing operation absent the lubricant. A thinner diameter of the coiled tubing would greatly reduce the cost associated with such an operation. In one non-limiting example, a coiled tubing operation that typically uses a $2^{3/8}$ inch coiled tubing may be reduced to a 2 inches coiled tubing when a layer of the lubricant is formed on and/or within the coiled tubing.

It has also been discovered that when the lubricant is added to the aqueous-based fluid, the need for potassium chloride as a clay stabilizer (within the base fluid) is greatly reduced. Said differently, the downhole fluid with the lubricant may have a reduced amount of potassium chloride as compared to a downhole fluid (without the lubricant) that typically uses potassium chloride for clay stabilization properties. When the vegetable oil derivative is added to the potassium chloride brines (without the clay stabilizer portion of the lubricant), the potassium chloride brines have low lubricity. However, the lubricant, having both the vegetable oil derivative and the clay stabilizer, increases the lubricity of the downhole fluid and also maintains the clay stabilizer properties in the absence of potassium chloride. Thus, the downhole fluid having the lubricant is a cost-effective alternative and has an increased lubricity as compared to a potassium chloride brine with only the vegetable oil derivative.

The lubricant may reduce at least one property, such as but not limited to friction, torque, drag, wear, operating temperatures of the first surface, corrosion of the first surface, and combinations thereof when the first surface contacts a second surface different from the first surface. The first surface may be or include, but is not limited to a wellbore casing, a drill string, a pipe, a formation, a drill bit, a metal surface within a mud motor, formation evaluation tool, at least one drilling tool, a coiled tubing, and combinations thereof. The pressure of the environment surrounding the first surface may be up to about 10,000 psi, alternatively from about 100 psi independently to about 8000 psi, or from about 200 psi independently to about 2000 psi.

The linear coefficient of friction (CoF) of the lubricant when mixed with an aqueous-based fluid does not change significantly over time; for example, a 2-week old downhole fluid with the lubricant mixed thereinto has about the same CoF as a downhole fluid freshly mixed with the lubricant. ("About the same" is defined as having a CoF that is different by no more than about 0.01.) The CoF of a downhole fluid is about the same even when the downhole fluid experiences rapid changes in temperature. For example, the temperature range of the downhole fluid may range from about 5° C. independently to about 200° C., or from about 20° C. independently to about 170° C.

The lubricant may be used as an integral component of existing downhole fluid formulations. The lubricant also may be added to a downhole fluid during well intervention operations, drilling operations, completion operations, and/or fracturing operations by a method known to those skilled in the art. For example, the lubricant may be injected into the pump suction, or may be added to a mud pit. The lubricant may be used with water-based downhole fluids. The phrase "water-based" or "aqueous-based" includes any downhole fluid comprising water or a water-based solution as the continuous phase, such as oil-in-water or oil-in-brine emulsions. In a non-limiting embodiment, the lubricant may be used in high density brines, such as a brine having a density as high as about 3,000 kg/m³ in a non-limiting embodiment; alternatively, the high density brine may have a density as high as about 2,500 kg/m³.

The lubricant may form a coherent lubricating film on at least the first surface, and a lubricating film may form on additional surfaces as needed. At least one surface may be a metal surface. As a result, merely including the lubricant in a downhole fluid extends the life of the coiled tubing, drill string, casing, etc.

In one non-limiting embodiment, the amount of the lubricant to mix into a downhole fluid may be calculated based on the average roughness of the first surface and/or the second surface. For example, if the average roughness of the coiled tubing string and the well casing are 8 µm and 12 µm, respectively, the lubricant may adhere to the surfaces and completely cover all of their asperities. Assuming that 90% of the mixed lubricant remains dispersed in the total downhole fluid, and knowing the well and coiled tubing string geometry (diameter and length), the minimum amount of lubricant may be calculated as follows in one non-limiting embodiment:

$$X_{min} = \frac{4 \times (8 \ \mu m \times d_{CT} + 12 \ \mu m \times d_{in})}{10\% \times (d_{in}^2 - d_{CT}^2)}$$

where $d_{CT}$ and $d_{in}$ are the external and internal diameter of the coiled tubing string and well casing, respectively. For example, for a 2 inch coiled tubing string and a 5.5 inches internal diameter casing, the minimum concentration of lubricant in the downhole fluid according to the formula would be about 0.5%.

The downhole fluid may include an effective amount of the lubricant to form a lubricating film on the first surface. In a non-limiting example, the amount of the lubricant within the downhole fluid may range from about 0.2 vol % independently to about 10 vol % of the total downhole fluid, alternatively from about 0.4 vol % independently to about 7 vol % in another non-limiting embodiment. The vegetable oil derivative may be present in the lubricant in an amount ranging from about 0.2 vol % independently to about 7 vol % of the total downhole fluid, alternatively from about 0.3 vol % independently to about 4 vol % of the total downhole fluid. As used herein with respect to a range, "independently" means that any threshold may be used together with another threshold to give a suitable alternative range, e.g. about 0.2 vol % ppm independently to about 0.4 vol % for the amount of lubricant in the downhole fluid is also considered a suitable alternative range.

The vegetable oil derivative may be or include, but is not limited to a sulfonated vegetable oil. Derivatives of the sulfonated vegetable oil may be or include, but are not limited to sulfonated (sulfated) castor oil, or the salts of the sulfonated (sulfated) vegetable oil, such as but not limited to sodium salts, potassium salts, calcium salts, magnesium salts, ammonium salts, and combinations thereof. A non-limiting example of the sulfonated vegetable oil is the ECOGLIDE™ supplied by Baker Hughes. In a possible, non-limiting mechanism, the salts of the sulfonated vegetable oil may be prepared by reacting sulfuric acid with the vegetable oil or derivative, which is a sulfation reaction where the sulfonate linkage may be formed by the reaction of the sulfuric acid with one or more of the double bonds. A non-limiting example of the sulfonated vegetable oil is the ECOGLIDE™ supplied by Baker Hughes. For example, with castor oil, the three hydroxyl groups on the triglyceride of the ricinoleic acid react with sulfuric acid and form a sulfate ester (C—O—S) where a small portion reacts with the double bonds in a sulfonation reaction to form the C—S bond. Thus, the salt is herein described as being "sulfonated (sulfated)". The vegetable oil and this mechanism of preparing the vegetable oil is more fully described may be found in U.S. Pat. No. 8,071,510; entitled "Method of Increasing Lubricity of Brine-Based Drilling Fluids and Completion Fluids", which is herein incorporated by reference in its entirety.

A non-limiting example of the clay stabilizer is the CLAYTREAT™ clay stabilizer supplied by Baker Hughes. The clay stabilizer may be present within the lubricant in an amount ranging from about 0.2 vol % independently to about 3 vol % of the total downhole fluid, or from about 0.4 vol % independently to about 2 vol % of the total downhole fluid in another non-limiting embodiment. The amount of the vegetable oil derivative may be the same or different from the amount of the clay stabilizer. The term "lubricant" is defined herein to include at least the vegetable oil derivative and the clay stabilizer.

Surfactants are generally considered optional, but may be used for solubility enhancement and/or haze stability of the lubricant once the lubricant has been added to the downhole fluid. The surfactant may be added or included as part of the lubricant, or the surfactant may be added to the downhole fluid before or after the lubricant has been added thereto. Such surfactant(s) may be present in the downhole fluid in an amount ranging from about 0.1 vol % independently to about 5 vol %, alternatively from about 0.5 vol % independently to about 3 vol %.

Non-limiting suitable surfactants may include, but are not necessarily limited to non-ionic surfactants, anionic surfactants, and blends thereof having a hydrophilic-lipophilic balance (HLB) ranging from about 1 independently to about 20, alternatively from about 10 independently to about 20. Suitable non-ionic surfactants may include, but are not necessarily limited to, alkyl polyether alcohols; polyoxyethylene sorbitan monopalmiate; polyoxyethylene sorbitan monostearate; polyoxyethylene sorbitan monooleate; linear alcohol alkoxylates; alkyl ether sulfates; dioxane; ethylene glycol; ethoxylated castor oils, such as polyethylene glycol castor oil, dipalmitoylphosphatidylcholine, ethylene oxide sulfonates, highly substituted benzene sulfonates, and combinations thereof; alkyl polyglycosides; sorbitan esters; methyl glucoside esters; amine ethoxylates; diamine ethoxylates; polyglycerol esters; alkyl ethoxylates; and combinations thereof. The alkyl polyether alcohols may be linear or branched polyoxyethylene alcohols in one non-limiting embodiment, such as a polyoxyethylene alcohol having from about 8 independently to 30 carbon atoms, alternatively from about 8 independently to about 20 carbon atoms, or from about 13 carbon atoms independently to about 15 carbon atoms where the polyoxyethylene alcohol may have from about 3 independently to about 50 moles of ethylene oxide, alternatively from about 3 independently to about 20 moles, or about 10 moles of ethylene oxide.

Suitable anionic surfactants may be or include, but are not limited to, alpha-olefin sulfonates as salts of a monovalent cation, such as an alkali metal ion like sodium, lithium, or potassium, an ammonium ion or an alkyl-substituent or hydroxyalkyl substitute ammonium in which the alkyl substituents may contain from about 1 independently to about 3 carbon atoms in each alkyl substituent. The alpha-olefin moiety may have from about 12 independently to about 16 carbon atoms. Non-limiting examples of alkyl ether sulfates may be or include salts of the monovalent cations referenced above; the alkyl ether sulfate may be an alkylpolyether sulfate having from about 8 independently to about 16 carbon atoms, alkyl ether sulfates, sodium lauryl ether sulfate (about 2 to about 3 moles of ethylene oxide), a $C_8$-$C_{10}$ ammonium ether sulfate (2 to about 3 moles of ethylene oxide), a $C_{14}$-$C_{16}$ sodium alpha-olefin sulfonate, and mixtures thereof.

The downhole fluid may be or include, but is not limited to, a well intervention fluid, a drilling fluid, a completion fluid, a fracturing fluid, a drill-in fluid, a workover fluid, and combinations thereof. In a non-limiting embodiment, the downhole fluid may be a water-based fluid, e.g. seawater. The downhole fluid may include polymers that are capable of viscosifying the downhole fluid and/or providing filtration control for the downhole fluid, e.g. a drilling fluid. The polymers may be non-toxic, and the type of polymers may depend upon the base fluid of the downhole fluid.

The downhole fluid is prepared using conventional procedures. The lubricant may be effective at pH values ranging from about 0 independently to about 12. In one non-limiting embodiment, the pH of a water-based downhole fluid having the lubricant (e.g. a drilling fluid) may range from about 9 independently to about 12; alternatively, the pH of a downhole fluid (e.g. a completion fluid, a well intervention fluid, etc.) may be less than 9, or range from about 6 independently to about 9 in a non-limiting embodiment. An acidic downhole fluid, such as an acidic completion fluid, may include the lubricant and have a pH ranging from about 0 independently to about 5 in another non-limiting embodiment. The pH of the downhole fluid may be adjusted with a suitable alkaline material, including but not necessarily limited to alkali metal hydroxides and alkali metal acetates. The alkali metal acetates may be or include, but are not necessarily limited to, sodium acetate and potassium acetate. The alkali metal hydroxides may be or include, but are not necessarily limited to, sodium hydroxide and potassium hydroxide.

Conventional additives may be used in the downhole fluid, including but are not necessarily limited to shale stabilizer(s), filtration control additive(s), suspending agent(s), dispersant(s), thinner(s), anti-balling additive(s), other types of lubricant(s), weighting agent(s), seepage control additive(s), lost circulation additive(s), penetration rate enhancer(s), corrosion inhibitor(s), acid(s), base(s), buffer(s), scavenger(s), gelling agent(s), soluble salts, biocides; one or more bridging and/or weighting agents may be added to the fluid, and combinations thereof. Suitable shale stabilizers include, but are not necessarily limited to glycols, inorganic salts, and encapsulating polymers, such as PHPA or acrylamide copolymers, alone or in aqueous solutions, and mixtures thereof. Suitable shale stabilizing inorganic salts include, but are not necessarily limited to alkali metal salts.

The invention will be further described with respect to the following Examples, which are not meant to limit the invention, but rather to further illustrate the various embodiments.

EXAMPLES 1-4

A linear friction tester was used for Examples 1-4 to test the coefficient of friction (CoF). The linear friction tester from IDM Instruments was modified to measure temperature-dependent lubricity measurements with real coiled tubing and well casing samples. The original glass plate of the tester was replaced with four metal surfaces: two planar metal sheets of different surface roughness (0.67 μm and 9.85 μm, respectively) and two real Cr13 and P110 tubular surfaces (11.83 μm and 12.44 μm, respectively). Several real 1.75 inch and 2 inches coiled tubing coupons were used for sliding on the metal surfaces. The average coiled tubing coupon roughness was 8.54 μm. For temperature measurements, a heating pad was installed below the metal plate and three thermocouples were used to measure the temperature at different locations above and below the metal plate. Scotch double-sided mounted tape was used for retaining fluids on the plate. Careful tape mounting was necessary to avoid fluid spilling. Each CoF shown below was averaged from 10 measurements performed under the conditions noted in each example. The standard deviations of the measurements were smaller than 4%, which means that there is great confidence in the repeatability and reliability of the experimental results.

The vegetable oil derivative used in each example was ECOGLIDE™ supplied by Baker Hughes, and the clay stabilizer was the CLAYTREAT™ clay stabilizer (a choline chloride) supplied by Baker Hughes.

EXAMPLE 1

The coefficient of friction (CoF) was measured for the samples at varying temperatures. The volume of each sample was 100 ml, and each sample had 1 ml of vegetable oil derivative in the sample; the base fluid for each sample varied and is noted in Table 1 below. The 'clay stabilizer brine' was the only sample to also have the CLAYTREAT™ in an amount of 0.2 ml; the base fluid for the 'clay stabilizer brine' was seawater. As noted by Table 1, the clay stabilizer brine had a comparable CoF as the sea water brine at all temperatures, and the clay stabilizer brine and the seawater brine both had the lowest CoF. In other words, the lubricant having the vegetable oil derivative and the clay stabilizer obtained the lowest CoF.

TABLE 1

The coefficient of friction (CoF) of the vegetable oil derivative in a base fluid at various temperatures.

| Temp | 2% KCl Brine CoF | Calgary Tap Water CoF | Sea Water CoF | Clay Stabilizer Brine CoF |
|---|---|---|---|---|
| 20 | 0.12 | 0.09 | 0.08 | 0.09 |
| 30 | 0.13 | 0.1 | 0.08 | 0.08 |
| 40 | 0.13 | 0.09 | 0.08 | 0.07 |
| 50 | 0.13 | 0.11 | 0.1 | 0.08 |
| 60 | 0.13 | 0.13 | 0.11 | 0.1 |
| 70 | 0.15 | 0.13 | 0.12 | 0.11 |

EXAMPLE 2

The effect of surface roughness on CoF at room temperature for each sample is shown in TABLE 2. The volume of each sample was 100 ml. The base fluid for each sample was seawater, and a variable concentration of the vegetable oil derivative was mixed thereinto. The lubricant included the clay stabilizer in an amount of 0.2 ml. The contact surface roughness for the plane surface 1 was 0.67 μm, 9.85 μm for the plane surface 2, 11.83 μm for the tubular surface 1, and 12.44 μm for the tubular surface 2. As noted by TABLE 2, the lubricity decreases (CoF increases) as the contact surface roughness increases.

TABLE 2

The effect of surface roughness on CoF at room temperature for sea water having varying vegetable oil derivative concentrations.

| Veg Oil Conc | Plane Surface 1 CoF | Plane Surface 2 CoF | Tubular Surface 1 CoF | Tubular Surface 2 CoF |
|---|---|---|---|---|
| 0 | 0.11 | 0.19 | 0.22 | 0.29 |
| 0.25 | 0.09 | 0.15 | 0.19 | 0.22 |
| 0.5 | 0.08 | 0.12 | 0.15 | 0.16 |
| 1 | 0.07 | 0.1 | 0.11 | 0.14 |
| 1.5 | 0.07 | 0.09 | 0.11 | 0.14 |
| 2 | 0.07 | 0.09 | 0.11 | 0.13 |

EXAMPLE 3

The lubricant in an amount of 1.2 ml was mixed into Calgary tap water for each sample. The total volume of each sample was 100 ml. For the first measurement set, the scotch tape was applied in such a way that the area wetted by the downhole fluid on the metal plate was 13.5×12.8 cm$^2$, denoted by 'large surface area' in TABLE 3. The large surface area planar plate had a surface roughness of 9.85 μm. For the second measurement set, the scotch tape was moved so that the area was wetted by the fluid on the metal plate was 13.5×6.4 cm$^2$, denoted by 'small surface area' in TABLE 3. That is, the small surface area is half of the large surface area. The small surface area planar plate had a surface roughness of 9.85 μm. As noted in TABLE 3, the CoF is about the same for each vegetable oil derivative concentration regardless of the surface area size.

TABLE 3

The effect of vegetable oil derivative concentration and contact area on CoF at room temperature.

| Veg Oil Conc | Large Surface Area CoF | Small Surface CoF |
|---|---|---|
| 0.25 | 0.155 | 0.095 |
| 0.5 | 0.098 | 0.1 |
| 1 | 0.104 | 0.105 |

EXAMPLE 4

Five samples including the lubricant in an amount of 0 ml, 0.25 ml, 0.5 ml, 1 ml, and 1.5 ml, respectively, in the base fluid of sea water were tested at varying temperatures. Each sample had a total volume of 100 ml and also included a friction reducer (an anionic polymer formed by copolymerizing acrylamide, acrylic acid, and acrylamide methylpropane sulfonic acid) in an amount of 0.1 ml. The control sample did not have any lubricant. The lubricant included the clay stabilizer in an amount of 0.2 ml. The CoF is noted in TABLE 4 for each sample and temperature tested, and the lowest CoF was obtained with the samples having the lubricant concentration of 1 vol % and 1.5 vol % (Samples 3 and 4, respectively).

TABLE 4

The effect of lubricant concentration on CoF at various temperatures.

| Temp | Control CoF | Sample 1 CoF | Sample 2 CoF | Sample 3 CoF | Sample 4 CoF |
|---|---|---|---|---|---|
| 20 | 0.16 | 0.13 | 0.09 | 0.07 | 0.07 |
| 30 | 0.15 | 0.11 | 0.08 | 0.07 | 0.07 |
| 40 | 0.14 | 0.1 | 0.07 | 0.06 | 0.06 |
| 50 | 0.13 | 0.09 | 0.08 | 0.07 | 0.07 |
| 60 | 0.12 | 0.09 | 0.09 | 0.08 | 0.09 |
| 70 | 0.14 | 0.13 | 0.12 | 0.1 | 0.1 |

EXAMPLE 5

The CoF of three sets of samples was tested at varying temperatures (20° C., 30° C., 40° C., 50° C., 60° C., and 70° C.). Each sample had 1 wt % lubricant therein; the composition of the lubricant was 27.1 wt % CLAYTREAT™ (choline chloride clay stabilizer), 25 wt % water, 24 wt % propylene glycol, 23.9% ECOGLIDE™ (vegetable oil). Each base fluid had a prehydrated polyacrylamide friction reducer in a salt solution added thereto in an amount of 0.1 wt %. The base fluid of the first sample was 2% KCl brine; the base fluid of the second sample was produced water, the base fluid of the third sample was seawater. As noted by Table 5, the lubricant had the lowest CoF at 50° C. for the produced water.

TABLE 5

CoF at various temperatures

| Temperature (Celsius) | 2% Kcl Brine CoF | Produced Water CoF | Seawater CoF |
|---|---|---|---|
| 20 | 0.1 | 0.08 | 0.09 |
| 30 | 0.09 | 0.08 | 0.08 |
| 40 | 0.08 | 0.08 | 0.08 |
| 50 | 0.08 | 0.07 | 0.09 |
| 60 | 0.1 | 0.09 | 0.1 |
| 70 | 0.11 | 0.1 | 0.11 |

EXAMPLE 6

An operation was conducted in a 5½ inch 'J shaped' monobore well in the Permian Basin. The lateral was approximately 3,500 ft in length with the majority of the inclination in the 88° to 92° range. The goal was to perform an annular fracture treatment with diversion achieved by utilizing a CT deployed packer. A previously conducted preparation ran in the well without the use of a lubricant revealed a CoF of 0.24 as illustrated in FIG. 1. When running the CT with a deployment packer, the new lubricant was introduced at a concentration of 1% with a pump rate of 1.2 bpm, while running in the hole at about 60 ft/min to uniformly distribute the lubricant in the lateral. Additional friction reducer (a prehydrated polyacrylamide friction reducer) was added at about 0.1 grams per ton (gpt). The lubricant and the friction reducer were circulated via constant rate chemical additive pumps to minimize any human errors during mixing.

Figure 2:
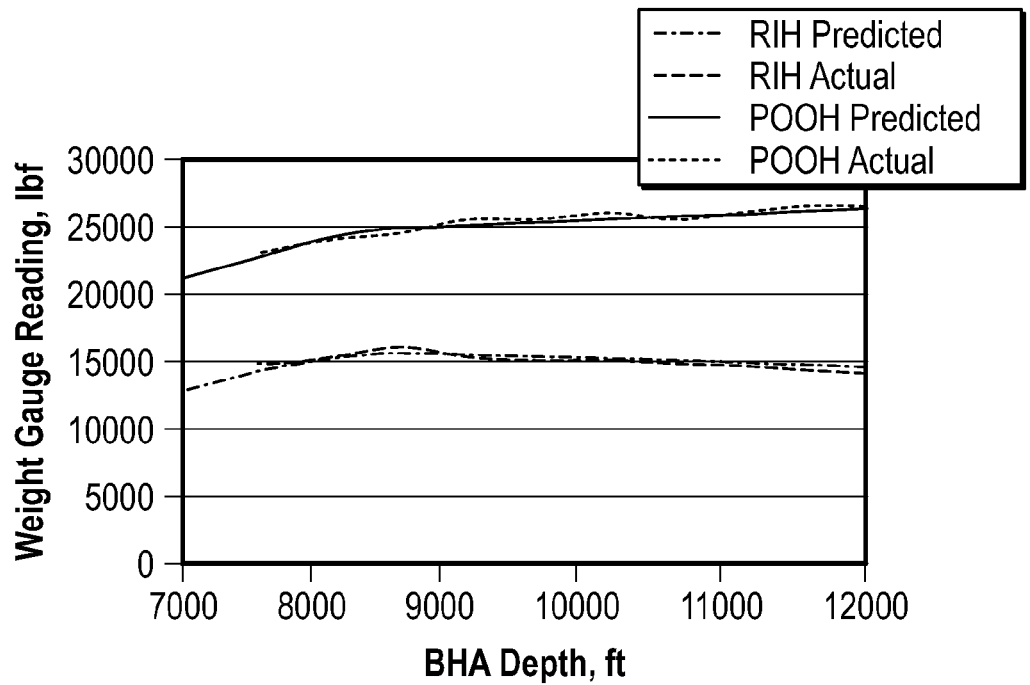
FIG. 2 is a graph illustrating the predicted and actual weight gauge curves during RIH and POOH with CoF of about 0.13 where a lubricant was added to the fluid in an amount of 1%.

Note that in FIG. 1, excess drag was present between about 9,000 and about 10,000 ft due to wellbore debris on POOH (the deviation between the actual and predicted weights during POOH). To allow post job calculations of both CoFs for RIH and POOH, additional pull tests were performed every 500 ft. Post job force matching revealed a CoF in the lateral of 0.13, a friction reduction of 46% when no lubricant was used. Similar CoF values (i.e., 0.10-0.14) were obtained in our laboratory tests with the same lubricant concentration at temperatures of about 70° C. The results of predicted and actual well data for both RIH and POOH when 1% lubricant was added are shown in FIG. 2.

EXAMPLE 7

Figure 3:
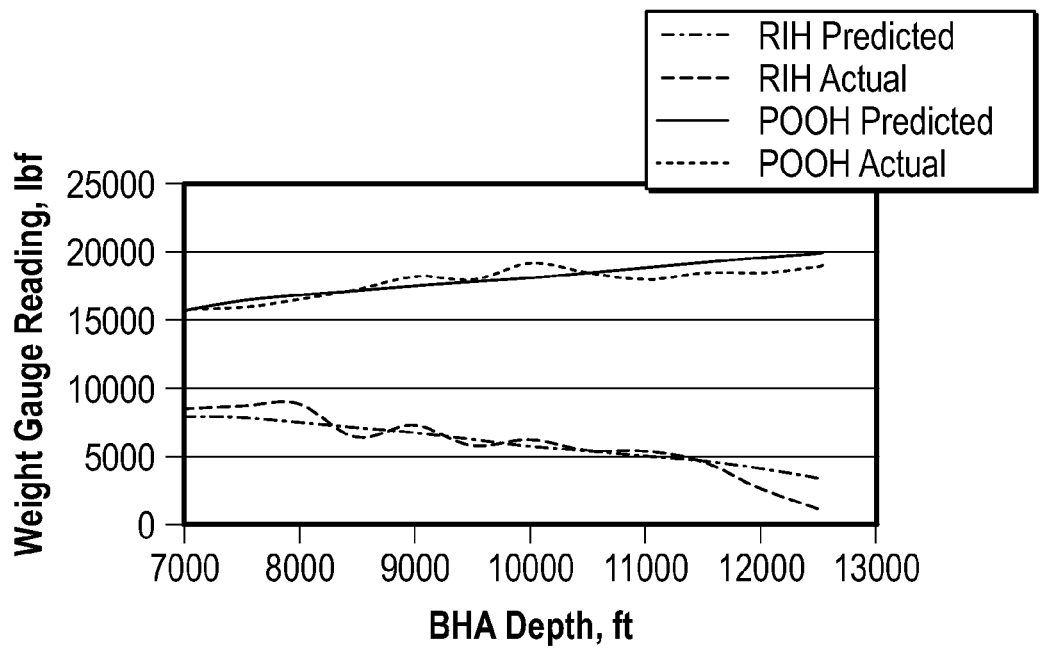
FIG. 3 is a graph illustrating the predicted and actual weight gauge curves during RIH and POOH with CoF of about 0.22 where no lubricant was present.

This operation was also conducted in a 5½ inch 'J shaped' monobore well in the Permian Basin. The lateral was approximately 5,100 ft in length with the majority of the inclination in the 89° to 93° range. Similar to Example 6, this operation was also to perform an annular fracture treatment with diversion achieved by utilizing a CT deployed packer. Previously, a conducted preparation ran in the well with the use of an extended reach fluid hammer tool revealed a CoF of about 0.22 with about 1,000 pound-force (lbf) tensile benefit as illustrated in FIG. 3. The slightly lower than expected CoF (i.e., 0.22 vs. 0.24 in Example 6) was attributed to the vibrations of the fluid hammer tool. When running the CT with a deployment packer for the fracture treatment, the lubricant was introduced at a concentration of 1% with a pump rate of about 0.75 bpm, while running in hole at 45 ft/min. This ensured that the lubricant was uniformly distributed in the lateral. Additional friction reducer (a prehydrated polyacrylamide friction reducer) was added at about 0.1 gpt. Both lubricant and friction reducer were circulated via constant rate chemical additive pumps to minimize any human errors during mixing.

Figure 4:
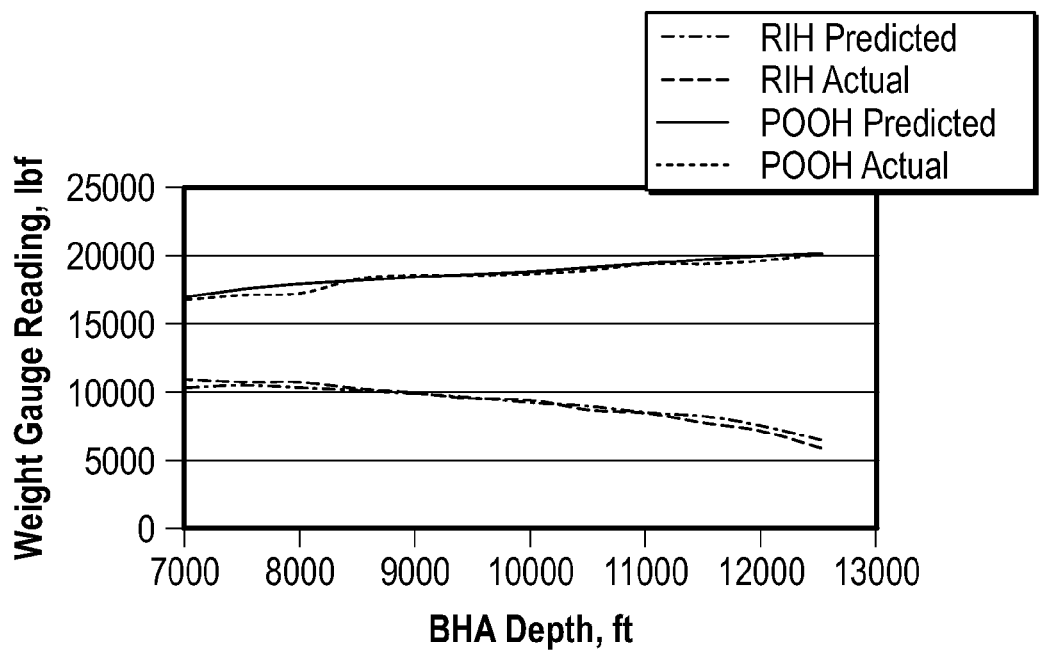
FIG. 4 is a graph illustrating the predicted and actual weight gauge curves during RIH and POOH with CoF of 0.13 where a lubricant was added to the fluid in an amount of 1%.

To allow post job calculations of both CoFs for RIH and POOH, additional pull tests were performed every 500 ft. Again, post job force matching revealed a CoF in the lateral of 0.13, a friction reduction of 41% when no lubricant was used. Similar CoF values (i.e., 0.10-0.14) were obtained in the laboratory tests with the same lubricant concentration at temperatures of about 70° C. The results of predicted and actual well data for both RIH and POOH when 1% lubricant was added are shown in FIG. 4.

In the foregoing specification, the invention has been described with reference to specific embodiments thereof, and has been described as effective in providing methods and fluid compositions for circulating a downhole fluid within a subterranean reservoir wellbore and lubricating a first surface where the downhole fluid includes a lubricant having a clay stabilizer and a vegetable oil derivative that is a sulfonated vegetable oil. However, it will be evident that various modifications and changes can be made thereto without departing from the broader spirit or scope of the invention as set forth in the appended claims. Accordingly, the specification is to be regarded in an illustrative rather than a restrictive sense. For example, specific downhole fluids, vegetable oil derivatives, clay stabilizers, surfactants, surfaces, temperatures, and pressures falling within the claimed parameters, but not specifically identified or tried in a particular fluid composition or method, are expected to be within the scope of this invention.

The present invention may suitably comprise, consist or consist essentially of the elements disclosed and may be practiced in the absence of an element not disclosed. For instance, the method may consist of or consist essentially of circulating a downhole fluid within a subterranean reservoir wellbore where the downhole fluid includes a lubricant having at least a clay stabilizer and a vegetable oil for lubricating a first surface where the vegetable oil may be a sulfonated vegetable oil, and where the downhole fluid may be or includes a drilling fluid, a completion fluid, a fracturing fluid, a drill-in fluid, a workover fluid, and combinations thereof. The fluid composition may include a downhole fluid consisting of or consisting essentially of an aqueous-based fluid and an amount of lubricant ranging from about 0.2 vol % to about 10 vol % of the total downhole fluid composition where the lubricant has or includes a clay stabilizer and a vegetable oil derivative that may be a sulfonated vegetable oil.

The words "comprising" and "comprises" as used throughout the claims, are to be interpreted to mean "including but not limited to" and "includes but not limited to", respectively.

What is claimed is:

1. A method comprising:
    circulating a downhole fluid within a subterranean reservoir wellbore, wherein the downhole fluid is selected from the group consisting of a well intervention fluid, a drilling fluid, a completion fluid, a fracturing fluid, a drill-in fluid, a workover fluid, and combinations thereof; and
    adding a lubricant to the downhole fluid for lubricating a first surface, wherein the lubricant comprises a choline chloride clay stabilizer and sulfonated vegetable oil, wherein the coefficient of friction of the choline chloride clay stabilizer is such that the lubricity of the lubricant is maintained while also increasing the clay stabilizing properties of the fluid, and wherein the lubricant increases the lubricity of the fluid.

2. The method of claim 1, wherein the first surface is selected from the group consisting of a wellbore casing, a drill string, a pipe, a formation, a drill bit, a metal surface within a mud motor, a formation evaluation tool, a drilling tool, a coiled tubing, and combinations thereof.

3. The method of claim 1, wherein the lubricant comprises the sulfonated vegetable oil in an amount ranging from about 0.2 vol % to about 7 vol % of the total downhole fluid and the choline chloride clay stabilizer in an amount ranging from about 0.2 vol % to about 3 vol % of the total downhole fluid.

4. The method of claim 1, wherein the downhole fluid is an aqueous-based fluid.

5. The method of claim 1 further comprising reducing at least one property selected from the group consisting of friction, torque, drag, wear, operating temperatures of the first surface, corrosion, and combinations thereof when the first surface contacts a second surface different from the first surface.

6. The method of claim 1, wherein the pressure surrounding the first surface is up to about 10,000 psi.

7. The method of claim 1, wherein the amount of the lubricant within the downhole fluid ranges from about 0.2 vol % to about 10 vol % of the total downhole fluid.

8. The method of claim 1, further comprising performing a coiled tubing operation.

9. A method comprising:
    circulating a downhole fluid within a subterranean reservoir wellbore, wherein the downhole fluid is selected from the group consisting of a well intervention fluid, a drilling fluid, a completion fluid, a fracturing fluid, a drill-in fluid, a workover fluid, and combinations thereof;
    adding a lubricant to the downhole fluid for lubricating a first surface, wherein the lubricant comprises a choline chloride clay stabilizer and sulfonated vegetable oil, wherein the coefficient of friction of the choline chloride clay stabilizer is such that the lubricity of the lubricant is maintained while also increasing the clay stabilizing properties of the fluid, and wherein the lubricant increases the lubricity of the fluid; and reducing at least one property selected from the group consisting of friction, torque, drag, wear, operating temperatures of the first surface, corrosion of the first surface, and combinations thereof.

10. The method of claim 9, further comprising performing a coiled tubing operation.

11. A method comprising:

circulating a downhole fluid within a subterranean reservoir wellbore, wherein the downhole fluid is selected from the group consisting of a well intervention fluid, a drilling fluid, a completion fluid, a fracturing fluid, a drill-in fluid, a workover fluid, and combinations thereof; and adding a lubricant to the downhole fluid for lubricating coil tubing, wherein the lubricant comprises a choline chloride clay stabilizer and sulfonated vegetable oil, wherein the coefficient of friction of the choline chloride clay stabilizer is such that the lubricity of the lubricant is maintained while also increasing the clay stabilizing properties of the fluid, and wherein the lubricant increases the lubricity of the fluid.

12. The method of claim 11, wherein the sulfonated vegetable oil is present in an amount ranging from about 0.2 vol % to about 7 vol % of the total downhole fluid, and wherein the choline chloride clay stabilizer is present in an amount ranging from about 0.2 vol % to about 3 vol % of the total downhole fluid.

13. The method of claim 11, wherein the amount of the lubricant within the downhole fluid ranges from about 0.2 vol % to about 10 vol % of the total downhole fluid.

14. The method of claim 11, wherein the pressure surrounding the first surface is up to about 10,000 psi.

15. The method of claim 11, wherein the downhole fluid further comprises a surfactant selected from the group consisting of non-ionic surfactants, anionic surfactants, and combinations thereof.

* * * * *